No. 786,608. PATENTED APR. 4, 1905.
R. SCHENCK.
VALVE FOR GAS GENERATORS.
APPLICATION FILED OCT. 19, 1904.
4 SHEETS—SHEET 3.
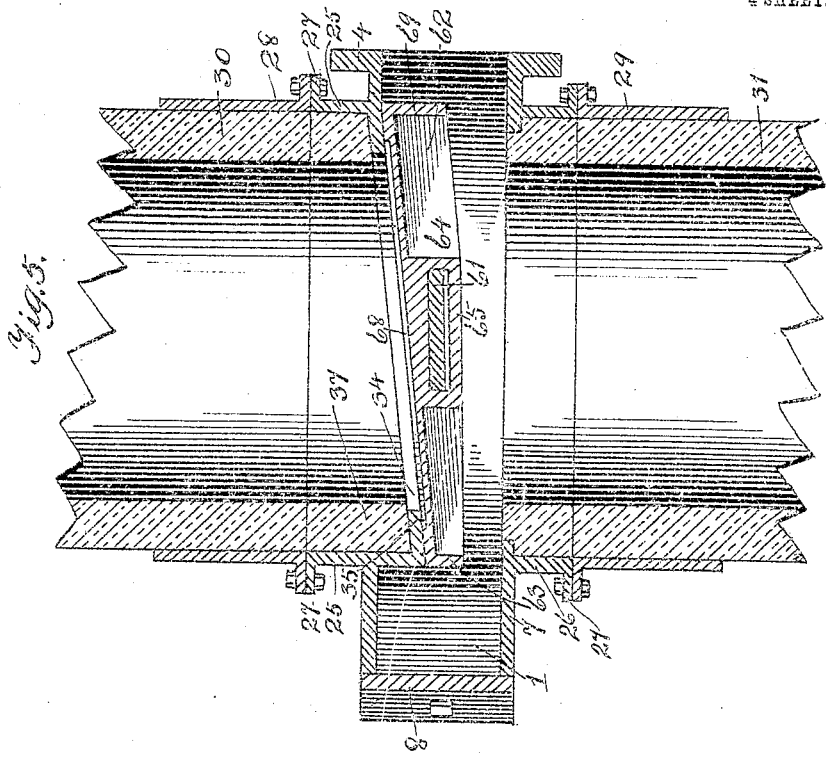
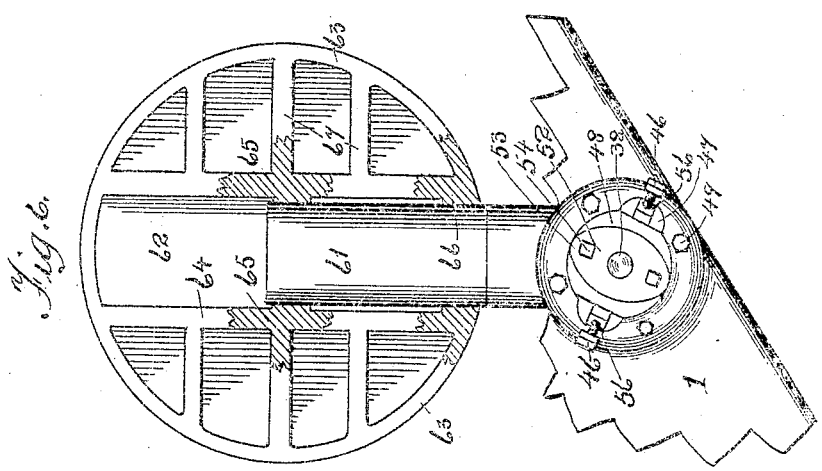
Witnesses:
William P. Bond.
Walter Banning.
Inventor
Rudolph Schenck
By Banning & Banning
Attys.

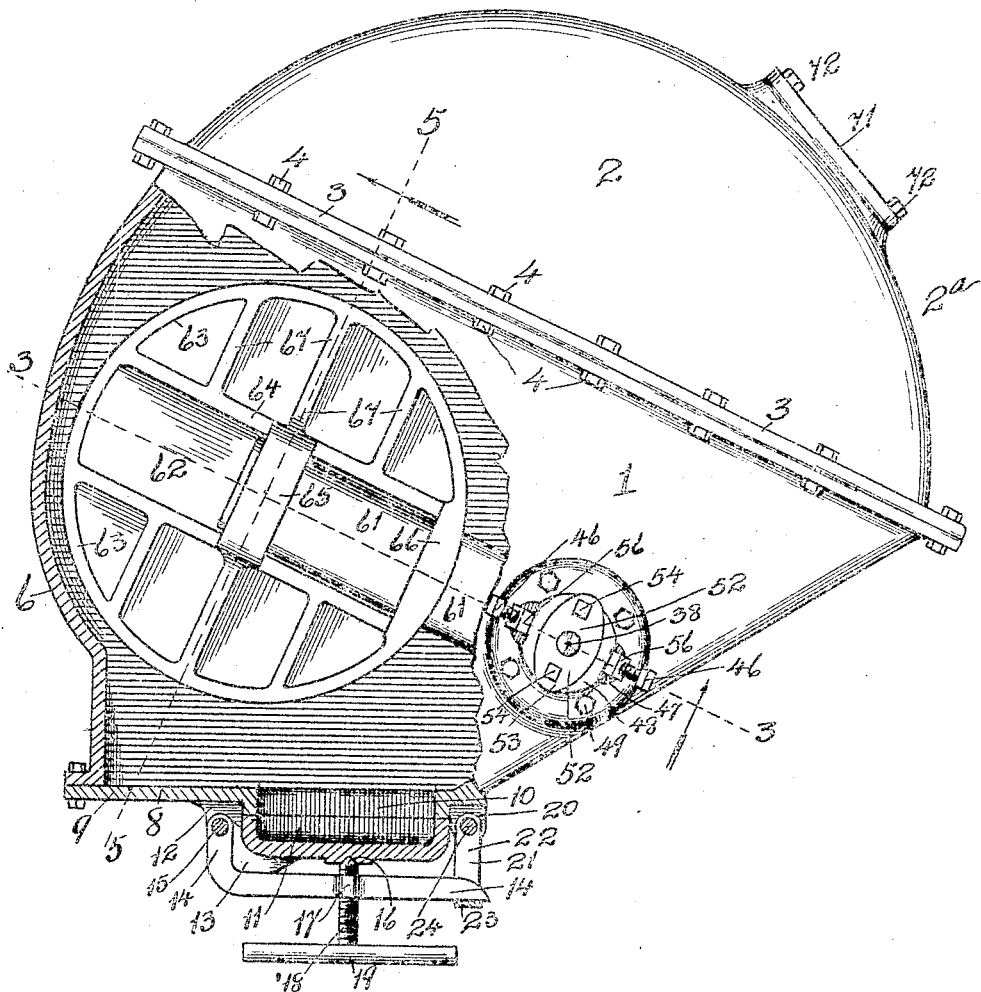

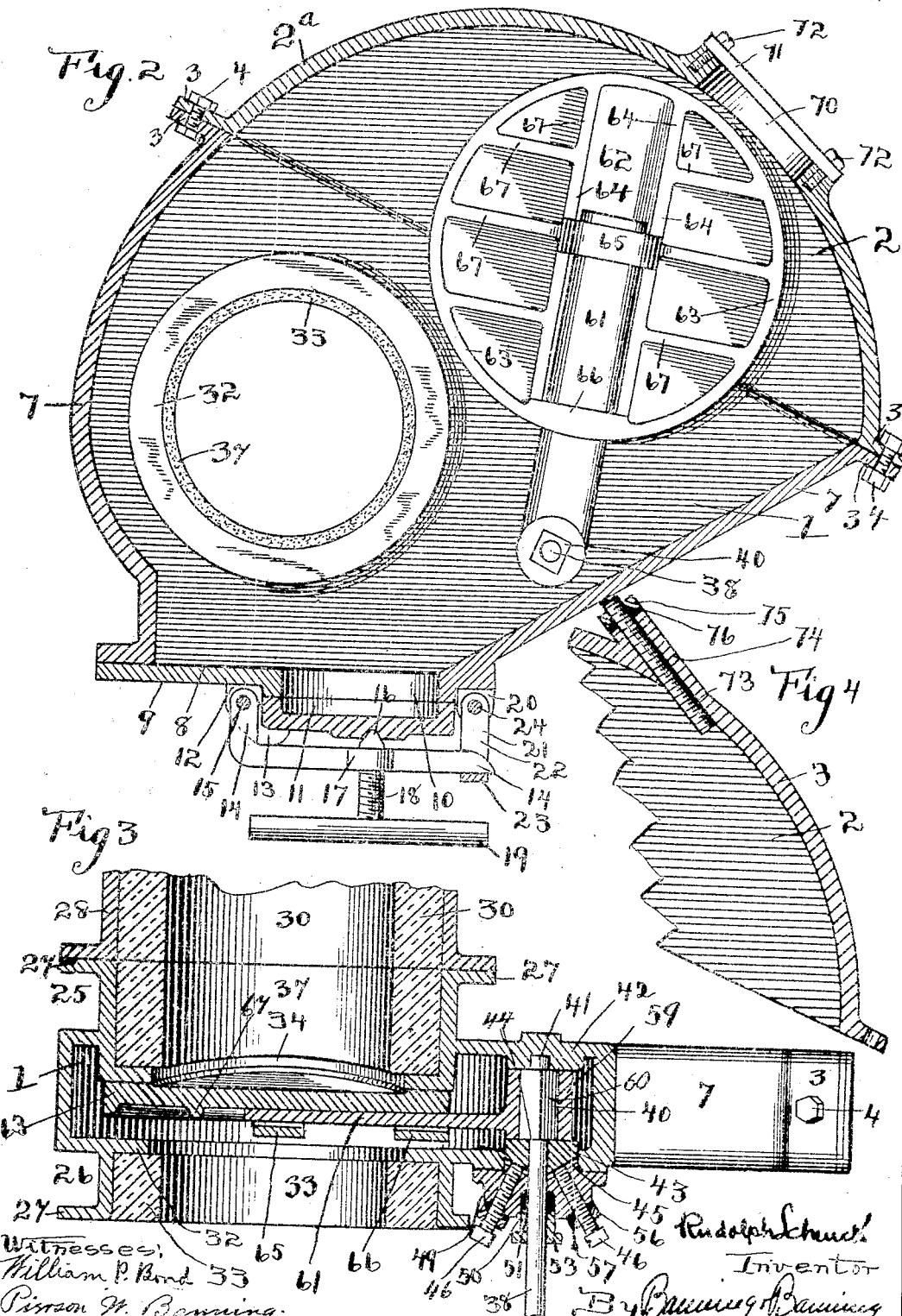

No. 786,603. PATENTED APR. 4, 1905.
R. SCHENCK.
VALVE FOR GAS GENERATORS.
APPLICATION FILED OCT. 19, 1904.

4 SHEETS—SHEET 4.

Witnesses:
William P. Bond
Pinson N. Banning

Rudolph Schenck
Inventor
By Banning & Banning
Attys.

No. 786,603.

Patented April 4, 1905.

UNITED STATES PATENT OFFICE.

RUDOLPH SCHENCK, OF CHICAGO, ILLINOIS, ASSIGNOR TO JOHN WILLIAMSON, OF CHICAGO, ILLINOIS.

VALVE FOR GAS-GENERATORS.

SPECIFICATION forming part of Letters Patent No. 786,603, dated April 4, 1905.

Application filed October 19, 1904. Serial No. 229,209.

*To all whom it may concern:*

Be it known that I, RUDOLPH SCHENCK, a citizen of the United States, residing at Chicago, in the county of Cook and State of Illinois, have invented certain new and useful Improvements in Valves for Gas-Generators, of which the following is a specification.

This valve is adapted and intended more particularly for use in apparatus for the manufacture of water-gas, but it can be used in other places in which it is desirable to employ a valve that will be capable of withstanding a high degree of heat and pressure and which at the same time will provide a tight seal to prevent the escape of gases.

Another object of the invention is to provide means for regulating the valve to allow for expansion and contraction of the parts from heat or other causes and to enable the parts to be initially regulated to form a close tight seal.

A further object of the invention is to provide means for cleaning out ashes or products of combustion from the interior of the valve-casing and also to provide means for obtaining access to the operative parts of the valve, and a final object of the invention is to improve the construction and operation of the valve as a whole, making it strong and durable and at the same time easily adjustable to meet the requirements of use.

The invention consists in the features of construction and combination of parts hereinafter described and claimed.

Figure 7:
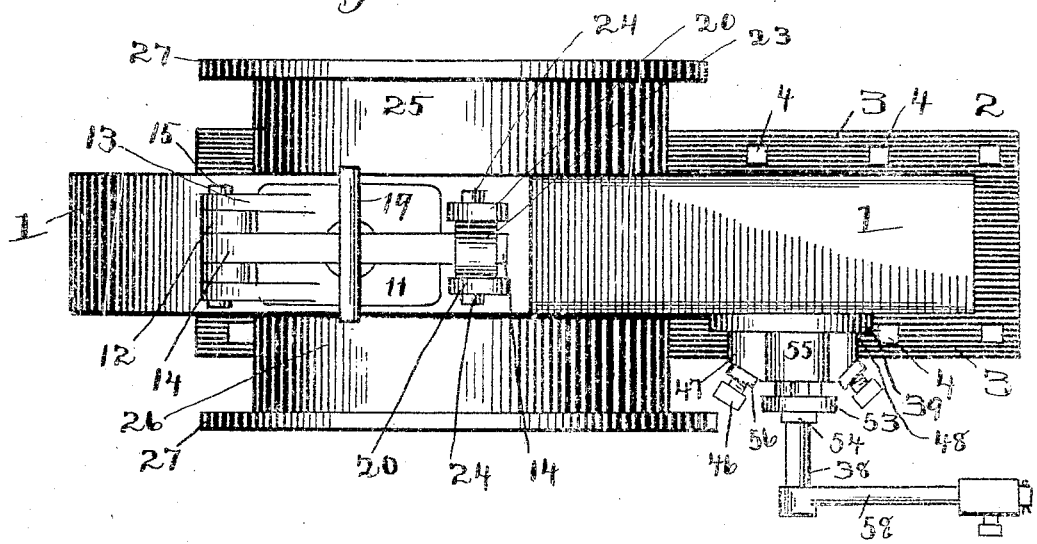
Figure 8:
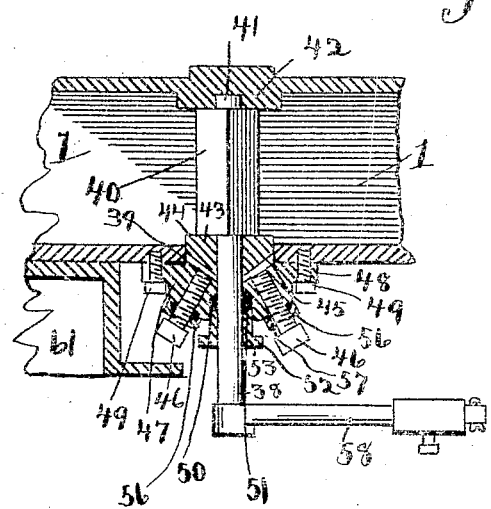

In the drawings illustrating the invention, Figure 1 is a plan view, partly broken away, showing the valve-door seated; Fig. 2, a sectional plan view of the valve and casing, showing the door unseated; Fig. 3, a sectional elevation taken on line 3 3 of Fig. 1 looking in the direction of the arrow; Fig. 4, a modification of the cap of the valve-casing; Fig. 5, a sectional elevation taken on line 5 5 of Fig. 1 looking in the direction of the arrow, with the cap or covering of the casing removed; Fig. 6, an enlarged detail, partly in section, of the arm and door, showing the mounting for the same; Fig. 7, an edge elevation of the casing, showing the door and stuffing-box; and Fig. 8, a detail in section of the stuffing-box and operating parts.

The valve is constructed to have a shell or casing 1, preferably of cast metal, closed by means of a semicircular cap 2, each of the sections being provided with flanges 3, secured together by bolts 4 or other similar means. The body-section 1 is provided with flat side walls 5 and edge walls 6 and 7 of suitable configuration to allow room for operation of the valve-door, and between the edge walls is an opening 8, closed by means of a door-plate 9, having therein a flanged opening 10 for the seating of a door 11. The door-plate is provided on one side of the flanged opening with outwardly-projecting ears 12, spaced a considerable distance apart, and between the ears and in facial contact therewith are a pair of hinges 13, cast onto and outwardly projecting from the door 11, and between the hinges and in line therewith is an L-shaped locking-arm 14, and the locking-arm and door-hinges are pivoted by means of a single pin or bolt 15, which passes through the ears, the hinges, and the locking-bar, as shown in Figs. 1, 2, and 7. The door is provided in its center with a recessed boss 16 and the locking-arm is provided in its center with an enlargement 17, through which passes a screw-threaded stud 18, the end of which is adapted to enter the recessed boss in the door, and the screw-threaded stud terminates in a cross-arm 19 for enabling the stud to be turned to exert pressure against the door.

On the side of the door opposite that on which are located the ears 12 are a pair of ears 20, between which is located a strap 21, consisting of side arms 22 and a cross-head 23, and the strap is pivoted between the ears by means of a pin or bolt 24, which allows the strap as a whole to be swung down over the end of the L-shaped locking-bar when thrown into position to close the door, so that the locking-bar will be held against outward projection as the screw-threaded stud is turned, thereby exerting a continuous pressure against the door for forcing it into place.

Outwardly projecting from opposite sides of the valve-casing are flanges 25 and 26, each of the flanges terminating in rims or ledges 27 for the attachment thereto of the flue-casings 28 and 29, which casings inclose the flues 30 and 31, of fire-brick or other refractory material, as shown in Fig. 5, between which flues the valve is located. Within the casing on one side is a circular inwardly-projecting flange or ledge 32, which forms an abutment for a lining 33, of fire-brick or other impervious material, which lining is of sufficient thickness to inwardly project beyond the edge of the flange or ledge and form a protection therefor. Immediately opposite the flange or ledge 32 is a flange or ledge 34, which forms a seat for the valve-door, and said seating flange or ledge is sloped or beveled, as best shown in Fig. 5, the slope or bevel being greatest on the side 35 toward the door-plate and least on the opposite side 36. The beveled seating-flange is likewise provided with a facing or lining 37, of fire-brick or other impervious material, which outwardly projects over the flange and forms a protection therefor.

Near the edge 7 of the section 1 of the casing is an operating-shaft 38, which passes transversely through the casing, and said shaft is inserted thereinto through a round hole 39 and is provided with a squared body portion 40, which terminates at the opposite end in a rounded stud 41, which seats into an inwardly-projecting boss 42, which boss likewise serves as a contact-face for the end of the section-body. The opposite end of the squared body rests against an adjustable block 43, having a flat inner or contact face 44 and a beveled or conical outer face 45, and the block 43 is of a size to allow it to be adjusted into and out of the hole 39 to provide a means for regulating the position of the operating-shaft within the casing. The position of the block 43 is regulated by means of two adjusting-screws 46, which pass diagonally through a stuffing-box 47 at right angles to the sloping face of the adjustable block or plug 43, so that by projecting or retracting the diagonally-disposed screws the position of the adjusting plug or block may be varied, which varies the position of the squared portion of the operating-shaft. The stuffing-box is provided with flanges 48, through which pass bolts 49 for securing the stuffing-box to the shell or casing. The stuffing-box is bored out on its interior to provide an annular chamber 50, within which is located a suitable packing 51, preferably asbestos or other impervious material, and said packing is compressed by means of a gland 52, preferably beveled out on its acting end and provided on its outer end with a flange 53, through which pass oppositely-disposed screw-threaded bolts 54, which enter outwardly-projecting lugs 55 on the body of the stuffing-box and are adjustable therein. The diagonally-disposed screw-bolts 46 are provided with lock-nuts 56, which are beveled out on their inner face and are screwed down onto a packing 57, of asbestos or similar impervious material, which packing prevents the escape of gas or fumes around the screw-threads of the adjusting screws or studs. The shaft 38 is operated by means of an arm 58 or other suitable means.

Surrounding the squared body portion of the operating-shaft is a sleeve 59, which is provided with a squared hole 60, and from said sleeve projects an arm 61, which is preferably rounded in cross-section, as shown in Fig. 5. The arm has loosely mounted thereon a valve-door 62, which door is provided on its rear or non-acting face with a circumferential rib 63 and two parallel longitudinal ribs 64, which form a channel for holding the arm 61 in position, and the door is secured to the arm by means of a central cross-strap 65 and an outer strap 66, through which straps the arm passes and within which it is loosely held for allowing a considerable vibration or movement to the valve-door. The door is further strengthened by means of a series of cross ribs or flanges 67, which extend from the longitudinal ribs to the circumferential rib and serve to strengthen the door to prevent bulging or buckling under the influence of heat or pressure. The seating-face 68 of the door is sloped or beveled to conform to the slope of the seating-flange which thickens the door at one side, and in order to properly balance the door it is cut off or beveled on its outer face on the side 69 of greatest thickness, which side coacts with the side 36 of the seating flange or face.

As before stated, the casing is closed by means of a closing-cap 2, the outer edge $2^a$ of which cap is rounded to conform to the curvature of the edge wall 6, which arrangement provides a smooth, continuous, and uninterrupted curving wall around the casing for the swing or movement of the door. The cap 2 is provided on its rounded edge with a flanged opening 70, which is closed by means of a plate 71, bolted onto the flange by means of bolts 72, which enables the closing-plate to be removed for the purpose of cleaning or for obtaining access to the interior of the valve-casing. In place of the opening 70, which is primarily intended for the purpose of removing ashes or sediment from the valve-casing, a diagonally-disposed steam-pipe 73 may be employed, which passes through a boss 74 and is locked by means of a lock-nut 75, adapted to receive a suitable packing 76. The steam-pipe is adapted to blow a jet of steam along the wall of the casing for the purpose of loosening up and driving out any sediment which may be deposited.

In use the valve-door is opened and closed by revolving the operating-shaft, and the door is allowed a certain amount of movement or play on the arm to permit it to properly adjust itself against the sloping seat with which it coöperates. It will be understood that in valves of this class the parts are often subjected to a very high degree of heat, which causes expansion and contraction and is liable to cause a certain amount of warping or bulging of the parts, so that if the door were fastened rigidly to the arm it might be impossible to perfectly seat the door under all circumstances. By connecting the parts in the manner indicated the door will find its proper seat and adjust itself to existing conditions. By beveling or sloping the seating-face of the door and the seat therefor it will be impossible to swing the door beyond a predetermined point, for the reason that when the door has reached its proper position it will be wedged into place and further movement will be impossible. By this wedging action the door is prevented from being swung beyond the opening which it is intended to close, and at the same time makes the tightness of the seal dependent upon the degree of revolution of the operating-shaft. It will often be necessary to adjust the door somewhat after it is properly positioned by reason of the fact that an initial adjustment must be made and subsequent adjustments made in case the parts become warped or bulged by excessive heat. Such adjustment can be readily made by projecting or retracting the diagonally-disposed adjusting screws or studs which bear against the adjusting-plug 43, against which the squared body of the operating-arm abuts. At the same time the operating-shaft and the adjusting-nuts are so packed that it will be impossible for gas or vapor to escape, which of course is a matter of great importance in the art to which the present invention relates. By forming the refractory lining for the flues of sufficient thickness to have its edge overlap the metallic portions of the casing the latter will be preserved from the direct action of the heat, which otherwise would tend in a short time to fuse or impair the parts. The method provided for cleaning the interior of the casing enables ashes or sediment to be readily removed, which would otherwise collect within the casing and prevent the valve-door from being swung back sufficiently to entirely clear the valve-opening, which it is necessary to do in order that no portion of the door may project into the line of travel of the products of combustion. If no means were provided for cleaning the casing at this point, the collection of ashes and sediment would in a short time be sufficient to prevent the door from being turned completely back into position, thereby allowing its projecting edge to lie directly in the draft through the flues, which would quickly fuse or burn off that portion of the door. By providing a cap for the casing of the form shown it is possible to cast the entire casing in but two parts, which can be quickly secured together and firmly united. It will be seen from the foregoing description that the valve as a whole is simple in construction and operation and that the parts are so arranged that they can be readily adjusted and properly positioned.

What I regard as new, and desire to secure by Letters Patent, is—

1. In a valve of the character indicated, the combination of a valve-casing, flues opening into the valve-casing, a revoluble operating-shaft entering the valve-casing, an arm projecting from and adapted to be swung by the operating-shaft, a valve-door carried by the arm, and means for adjusting the position of the arm and door to properly seat the door when swung into place by the turning of the shaft, substantially as described.

2. In a valve of the character indicated, the combination of a valve-casing, flues opening into the valve-casing, a revoluble operating-shaft entering the valve-casing, an arm carried by the operating-shaft, a valve-door loosely carried by the arm, and means for adjusting the position of the arm and door to properly seat the door when swung into place by the turning of the shaft, substantially as described.

3. In a valve of the character indicated, the combination of a valve-casing, flues opening into the valve-casing, a revoluble operating-shaft entering the valve-casing, an arm carried by the operating-shaft, a beveled or wedge-shaped valve-door loosely carried by the arm, and means for adjusting the position of the arm and door to properly seat the door when swung into place by the turning of the shaft, substantially as described.

4. In a valve of the character indicated, the combination of a valve-casing, flues opening into the valve-casing, one of the flues having a sloping seating-face, a revoluble operating-shaft extending transversely through the valve-casing, a stuffing-box surrounding the shaft, an adjusting-plug surrounding the shaft and provided with a beveled rear face, diagonally-disposed adjusting screws or studs bearing against the beveled face of the adjusting-plug and adapted to inwardly project the plug, a sleeve carried by the operating-shaft and adapted to have its position regulated by means of the adjusting-plug, an arm outwardly projecting from the sleeve, and a valve-door carried by the arm and adapted to close and open communication between the flues, substantially as described.

5. In a valve of the character indicated, the combination of a valve-casing, flues opening into the valve-casing, one of the flues having a sloping seating-face, a revoluble operating-shaft extending transversely through the valve-casing, a stuffing-box surrounding the shaft, an adjusting-plug surrounding the shaft and provided with a beveled rear face, diagonally-disposed adjusting screws or studs bearing against the beveled face of the adjusting-plug and adapted to inwardly project the plug, a sleeve carried by the operating-shaft and adapted to have its position regulated by means of the adjusting-plug, an arm outwardly projecting from the sleeve, and a valve-door loosely carried by the arm and adapted to close and open communication between the flues, substantially as described.

6. In a valve of the character indicated, the combination of a valve-casing having flat sides and rounded edge walls and consisting of two sections, each of the sections having its side walls and edge wall formed integral, the opposite side walls being provided with openings for the flues, ledges or flanges around the openings, one of the flanges being sloped or beveled to form a seating-face, a lining of impervious material of a thickness to project over and protect the flanges, an operating-shaft entered into the casing, an arm outwardly projecting from the operating-shaft, and a door carried by the arm having a beveled or sloping seating-face and adapted to seat against the first-mentioned seating-face, substantially as described.

7. In a valve of the character indicated, the combination of a valve-casing having flat sides and rounded edge walls and consisting of two sections, each of the sections having its side walls and edge wall formed integral, the opposite side walls being provided with openings for the flues, ledges or flanges around the openings, one of the flanges being sloped or beveled to form a seating-face, a lining of impervious material of a thickness to project over and protect the flanges, an operating-shaft entered into the casing, an arm outwardly projecting from the operating-shaft, a door carried by the arm having a beveled or sloping seating-face and adapted to seat against the first-mentioned seating-face, and means for regulating the position of the arm to properly seat the door, substantially as described.

8. In a valve of the character indicated, a valve-casing having flat side walls and connecting edge walls, the side walls being provided with openings, flues connected with the openings, a valve-door operable within the casing to regulate communication between the flues, and a steam-pipe extending diagonally through the edge wall of the casing and adapted to project a jet of steam thereinto to clean out sediment or the products of combustion, substantially as described.

9. In a valve of the character indicated, a valve-casing, an operating-shaft entering thereinto, a valve-door operable by means of the shaft, an adjusting-plug adapted to regulate the position of the arm and provided with a beveled rear face, a stuffing-box for the shaft consisting of a gland and packing, two diagonally-disposed adjusting-screws passing through the casing for the stuffing-box and bearing against the rear beveled face of the adjusting-plug, lock-nuts on the screws, and a packing within the lock-nuts, substantially as described.

RUDOLPH SCHENCK.

Witnesses:
MAX SCHMIDT,
WILLIAM STAMMON.